(12) United States Patent
Yoon et al.

(10) Patent No.: US 6,386,768 B1
(45) Date of Patent: May 14, 2002

(54) SLIP OPTICAL CONNECTOR MODULE

(75) Inventors: Eung-Yeoul Yoon, Suwon; Il Kim, Yongin; Bum-Soo Kim, Seoul, all of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/561,924

(22) Filed: May 1, 2000

(30) Foreign Application Priority Data

Apr. 29, 1999 (KR) .............................. 99-15432

(51) Int. Cl.[7] ................................. G02B 6/36
(52) U.S. Cl. ..................... 385/88; 385/53; 385/78
(58) Field of Search .................... 385/88–94, 49, 385/59, 60, 78, 83, 53

(56) References Cited

U.S. PATENT DOCUMENTS

| | | | |
|---|---|---|---|
| 4,233,724 A | 11/1980 | Bowen et al. | 29/428 |
| 5,005,939 A | 4/1991 | Arvanitakis et al. | 385/53 |
| 5,071,219 A | 12/1991 | Yurtin et al. | 385/78 |
| 5,168,537 A | 12/1992 | Rajasekharan et al. | 385/89 |
| 6,238,100 B1 * | 5/2001 | Sasaki et al. | 385/59 |

OTHER PUBLICATIONS

Grims et al. "Photonic Packaging Using Laser/Receiver Arrays and Flexible Optical Circuits" IEEE, vol. 20, Nov. 1997 pp. 409–415.*
Kurata et al. "A Surface Mount Type Single–Mode Laser Module Using Passive Alignment", IEEE, 1995, pp. 759–765.*
European Search Report, dated Oct. 25, 2000.

* cited by examiner

Primary Examiner—Phan T. H. Palmer
(74) Attorney, Agent, or Firm—Robert E. Bushnell, Esq.

(57) ABSTRACT

An optical connector module including: a holder including at least one optical device and electrode; a connector having at least one optical fiber for light transmission, to correspond to the optical device, and latches; and a body in an open structure without top and bottom plates, having a base, a pair of sidewall portions extending from the base, a binding space for receiving the holder and the connector such that the input/output ends of the optical fiber of the connector are aligned to the optical device of the holder, and latch-receiving grooves on the sidewall portions to receive the latches of the connector. The configuration of the optical connector module allows for a slim design and thus it can be applicable for high-speed signal transmission and reception to a slim device which requires such a thin optical connector module.

22 Claims, 7 Drawing Sheets

SLIP OPTICAL CONNECTOR MODULE

CLAIM OF PRIORITY

This application makes reference to, incorporates the same herein, and claims all benefits s accruing under 35 U.S.C. §119 from my application OPTICAL CONNECTOR MODULE filed with the Korean Industrial Property Office on Apr. 29, 1999 and there duly assigned Serial No. 15432/1999.

BACKGROUND OF THE INVENTION

1. Field of the Invention

The present invention relates to an optical connector module for coupling optical devices and optical fibers, and more particularly, to an optical connector module having a slim design.

2. Description of the Related Art

Optical connector modules guide light transmission by coupling optical fibers and optical devices. The light devices serve as a light source for converting electrical signals into optical signals and/or a photodetector for receiving light transmitted through optical fibers and converting the optical signals into electrical signals. The light devices are usually in the form of an array.

Such an optical connector module is installed between devices for information transfer through optical transmission, for example, between a computer and a bus or a monitor, or between buses. Typically, the optical connector module is adapted to an optical transmission module employing a plurality of channels in the form of an array for independent light transmission.

However, I have not seen optical connector modules that are made thin enough to be used in notebook and laptop computers. This is because optical connector modules are made of plastic and are made very thick to be able to withstand external impact. Also, the bonding methods of aligning optical fibers to optical devices are not amenable to many designs for an optical connector module.

SUMMARY OF THE INVENTION

To solve the above problems, it is an objective of the present invention to provide an optical connector module having an improved structure for a slim design and an easy bonding process.

It is also an object to provide a metallic top plate to accommodate a thin design while avoiding external impact.

It is yet another object to provide a design for optical connector modules that have a thin design and are easily bonded.

It is still yet another object to provide an optical connector module that is thin enough to be used in laptop and notebook computers.

It is also yet another object to provide an optical connector module that is absent of thick top and bottom covers.

The above objects of the present invention are achieved by an optical connector module comprising: a holder including at least one optical device and electrode; a connector having at least one optical fiber for light transmission, to correspond to the optical device, and latches; and a body in an open structure without top and bottom plates, having a base, a pair of sidewall portions extending from the base, a binding space for receiving the holder and the connector such that the input/output ends of the optical fiber of the connector are aligned to the optical device of the holder, and latch-receiving grooves on the sidewall portions to receive the latches of the connector.

Preferably, the optical connector module further comprises means for guiding the connector to an accurate position within the binding space of the body. The means for guiding the connector may comprise: guide projections on both the outer sides of the connector or on both the inner sides of the sidewall portions of the body; and guide grooves on both the inner sides of the side wall portions of the body or on both the outer sides of the connector, the guide grooves for slidably receiving corresponding guide projections.

In another embodiment, the means for guiding the connector may comprise: a pair of round guide portions at least the leading parts on the sides of the connector; and a pair of round guide grooves on the inner walls of the sidewall portions of the body, to correspond to the round guide portions, the round guide grooves for slidably receiving the round guide portions. Preferably, the pair of round guide grooves have different curvatures, and the pair of round guide portions on the connector have different curvatures to correspond to those of the round guide grooves, to indicate an appropriate insertion direction of the connector into the body.

Preferably, the optical connector module further comprises: a first electrode member on the leading side of the connector, on which the input/output ends of the optical fiber are arranged, the first electrode member being electrically connected to electric wires supported by the connector; and a second electrode member on the holder, being formed corresponding to the first electrode member, wherein as the holder and the connector are combined with the body, the first and second electrode members are electrically coupled to transmit an electrical signal.

Preferably, the optical connector module further comprises a cover member being opened downward to cap the body with the connector and holder. The cover member may have flanges at the bottom edges of both sides thereof, for use in attaching the optical connector module to a predetermined device.

In another embodiment of the present invention, there is provided an optical connector module comprising: a connecting unit in which at least one optical device is coupled to at least one optical fiber; and a cover member being opened downward, capping the top and two sides of the connecting unit and fixed to the top of the substrate of a predetermined device to stably maintain the combination of the connecting unit within the cover member, wherein the cover member forms a support structure of the connecting unit along with the substrate of the device.

Preferably, the connecting unit is designed to enable attachment and detachment of the optical fiber or the optical device to and from the connecting unit, and the cover member has at least one open side to enable attachment and detachment of the optical fiber or the optical device to and from the connecting unit.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
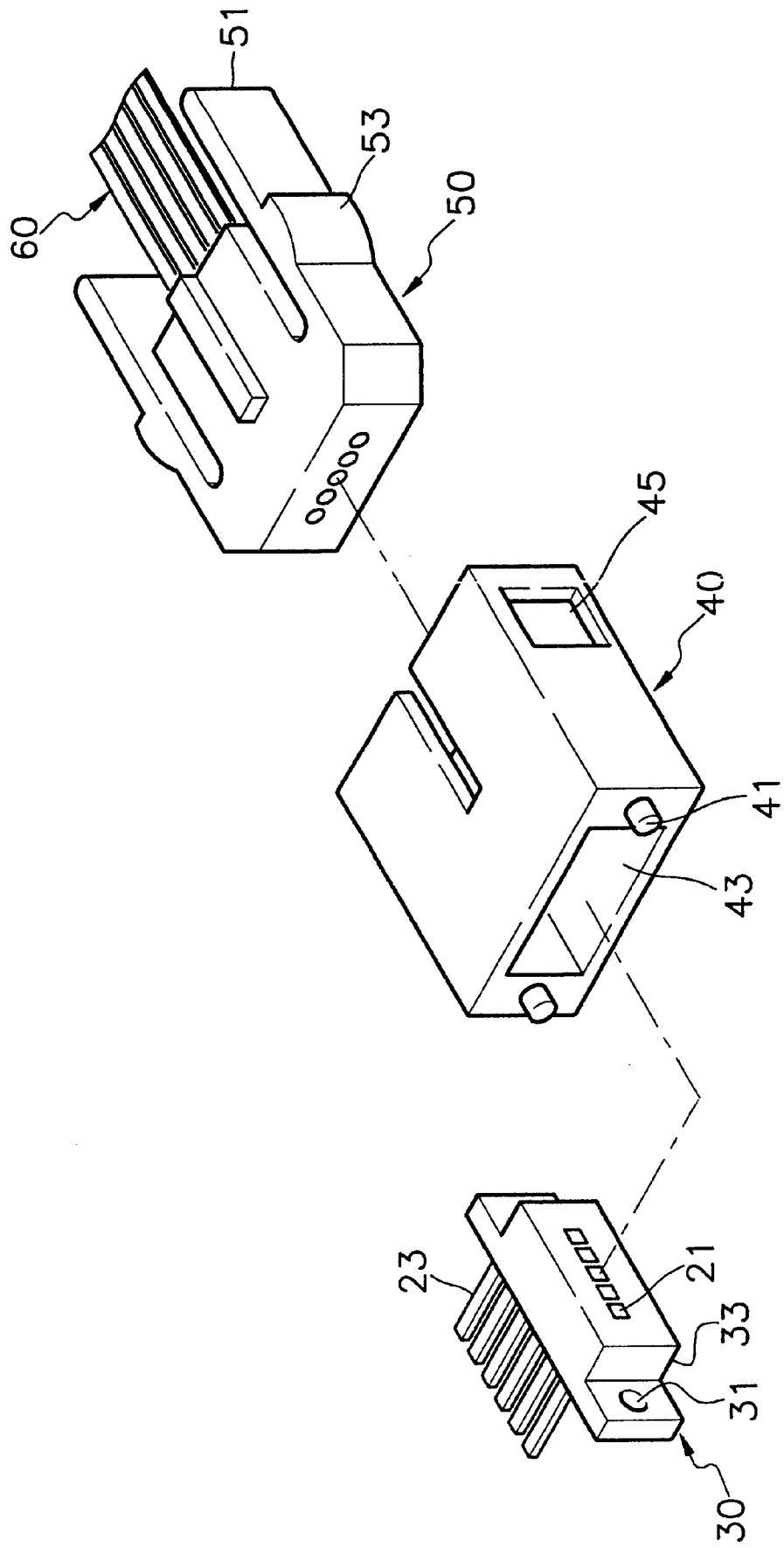
FIG. 1 is an exploded perspective view of an optical connector module previously suggested by the instant inventors.

FIG. 1 illustrates an optical connector module suggested by the inventors of the present application. The optical connector module includes a holder 30 having an optical device 21 and an electrode 23, a connector 50 for receiving optical fibers 60 are installed, and a housing 40 having a hollow 43 for insertion of the holder 30 and the connector 50 there into.

A coupling side 33 to which the optical device is attached is inserted into the hollow 43 of the housing 40. The connector 50 has a pair of flexible portions 51 with latches 53 at the sides thereof. The latches 53 of the connector 50 interact with latch-receiving grooves 45 formed at the housing 40, which maintains the connector 50 within the housing 40. During the combination, reference posts 41 disposed at one side of the housing 40 engage with reference holes 31, which are formed at the holder 30 to receive corresponding reference posts 41, which ensures accurate alignment between the optical device 21 and the optical fibers 60.

When such a holder, connector and housing are manufactured with plastic to lower the manufacturing cost, the top and bottom plates of the housing must be formed to be thick enough to able to withstand external impact, which prohibits a slim design. Thus, such a housing structure cannot be adopted to flat display devices such as monitors for notebook computers and liquid crystal displays, which require a slim connector whose thickness is 2 mm or less.

Due to the structure of the housing 40, the optical device 21 must be attached to the holder 30 by die bonding and subjected to wire bonding, prior to the insertion of the holder 30 into the housing 40. Thus, there are difficulties during the bonding process in jigging a relatively small holder 30 and in accurately aligning optical fibers to optical devices due to the absence of reference points for guiding the coupling.

Figure 2:
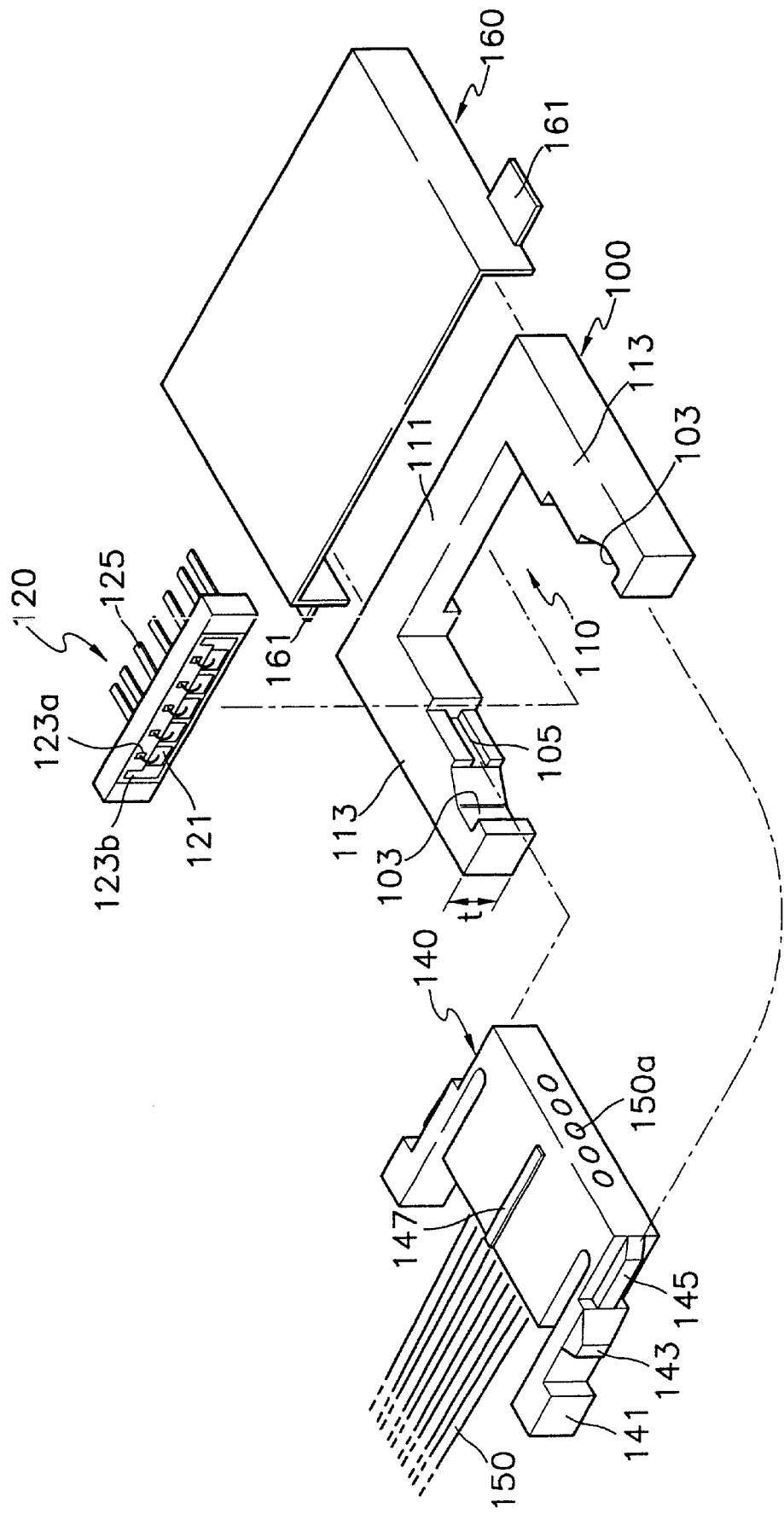
FIG. 2 is an exploded perspective view showing the structure of an optical connector module according to a preferred embodiment of the present invention.

Referring to FIG. 2, an embodiment of an optical connector module in accordance with the present invention includes a holder 120 for receiving at least one optical device 121 and leads 125, a connector 140 for receiving at least one optical fiber for light transmission, and a body 100 for accommodating the holder 120 and the connector 140 such that the optical devices 121 mate with the input/output ends of optical fibers 150. It is preferable that the optical connector module according to the present invention further includes a cover member 160 for holding the combination of the holder 120 and the connector 140 in the binding space 110 of body 100 and attaching the optical connector module according to the present invention to a predetermined device. In this case, the holder 120, the connector 140 and the body 100 constitute a connecting unit which allows separation of the optical devices 121 and the optical fibers 150 as needed.

The holder 120 has predetermined electrode patterns 123a and 123b at the optical device receiving side. The optical device 121, which is a light emitter for emitting a light signal from an electrical signal applied through the leads 125, and/or a light receiver for receiving a light signal and converting the same into an electrical signal for transmission through the leads 125, is mounted over the base electrode pattern 123b and wire bonded to the electrode pattern 123a. The optical devices 121 are arranged in the form of an array suitable for signal transmission through multiple channels. Preferably, the light receiver is a photo diode and the light emitter is a vertical cavity surface emitting laser for irradiating light in the semiconductor stack direction. The vertical cavity surface emitting laser is characterized in that the output beam thereof is almost circular, and thus its optical coupling efficiency is high without need for an additional coupling means.

In the connector 140, the optical fibers 150 are aligned in an array, corresponding to the optical device 121, and flexible portions 141 are formed at both sides thereof to surround the optical fibers 150. At the flexible portions 141, latches 143, which allow for slidable combination with the body 100 without need for additional coupling means, are formed. In addition, guide projections 145 for guiding the connector 140 into a predetermined position of the body 100 are formed at the flexible portions 141. It is preferable that an indicator 147 which indicates the correct insertion direction of the connector 140 into the body is disposed on the connector 140. The optical fibers 150 may be plastic optical fibers having a diameter of, but preferably approximately 0.5 mm. For this case, the connector 140 may be formed of a common plastic mold, and the optical fibers 150 may be fixed to the connector 140 with an adhesive. The optical fibers 150 may be fixed to the connector 140 in an insert-and-mold manner during the manufacture of the connector 140.

The body 100 has a base 111 and a pair of sidewall portions 113 extending from the base 111. On the inner walls of the sidewall portions 113, latch-receiving grooves 105 for receiving the latches 143 of the connector 140, and guide grooves 105 are formed. The guide grooves 105 slidably receive the guide projections 145 of the connector 140 until the connector 140 is seated at an appropriate position. The body 100 adopts an open structure without top and bottom plates, and the base 111 and the pair of sidewall portions 113 form a binding space 110 for receiving the holder 120 and the connector 140. The binding space 110 provides for a combination of the holder 120 and the connector 140, and allows accurate coupling of the input/output ends 150a of the optical fibers 150 to the optical device 121.

The body 100 adopting such a structure may be manufactured of a plastic mold having a thickness t, which is thin enough as shown in FIG. 2. The holder 120 also can be manufactured of a plastic mold, thereby lowering the cost of the optical connector module.

For example, the body 100 can be manufactured to have a thickness of 2 mm or less, but preferably a thickness of 1.7 mm. Also, the thicknesses of the connector 140 and the holder 120 may be smaller than or equal to the thickness of the body 100, such that the thickness of the entire optical connector module including the cover member 160 is 2 mm or less. The optical connector module according to the present invention is applicable to a flat display device, and particularly, to a display for notebook computers which requires a thin connector having a thickness of 2 mm or less, in order to convert an optical image signal from the main body to an electrical image signal, which allows for a high-speed transmission/reception of image signals.

The open configuration of the body 100 without top and bottom plates assures a sufficient space for bonding operations. The optical device 121 mounted on the holder 120 can be subjected to die bonding and wire bonding operations after the holder 120 is set up the base 111 of the body 100. Thus, the body 100 and the holder 120 of the optical connector module maybe designed as a combination type, rather than as the separate type shown in the present embodiment. For these cases, the guide grooves 105 of the body 100 can be used as a reference point for bonding operations, which ensures easy assembling and accurate alignment between the optical fibers 150 and the optical device 121.

When the connector 140 is inserted into the body 100 with the holder 120 after bonding operations, the flexible portions 141 of the connector 140 are pushed inward in contact with the sidewall portions 113 of the body 100 and then restored as soon as the latches 143 engage with the latch-receiving grooves 103, which provides a locking mechanism to maintain the connector 140 within the body 100 after insertion. Also, the engagement between the latches 140 and the latch-receiving grooves 103 are released by intentionally further pushing the flexible portion 141 inward.

The cover member 160 firmly maintains the combination of the body 100, the holder 120 and the connector 140 and simultaneously acts as a means for attaching the optical connector module, i.e., the connecting unit, according to the present invention to a predetermined device. The cover member 160 is opened downward to accommodate the connecting unit in contact with the top and sides of the same, and is attached to the substrate of a predetermined device while holding the connecting unit therein. The cover member 160 forms a support structure of the connecting unit along with the substrate of the device, for example, a printed circuit board 170 (see FIG. 3), which will be described later, to which the cover member 160 has been fastened.

For example, the cover member 160 may be formed by bending a thin metal plate having a thickness of 0.2 to 0.3 mm such that the bottom thereof is opened as described previously. Also, one side of the cover member 160 may be opened to allow for optional attachment or detachment of the connector 140 with the optical fibers 150 to or from the connecting unit. Contrary, the other side of the cover member 160 may be opened to allow for optional attachment or detachment of the holder 120 with the optical device 121 to or from the connecting unit.

The cover member 163 surrounds the outer sides of the sidewall portions 103 and the top of the body 100, and the connecting unit is kept within the cover member 160 by restoring forces on the body 100. Thus, as described above, the optical connector module according to the present invention, including the cover member 160, can be manufactured to have a thickness t' of a total of is 2 mm or less.

Figure 3:
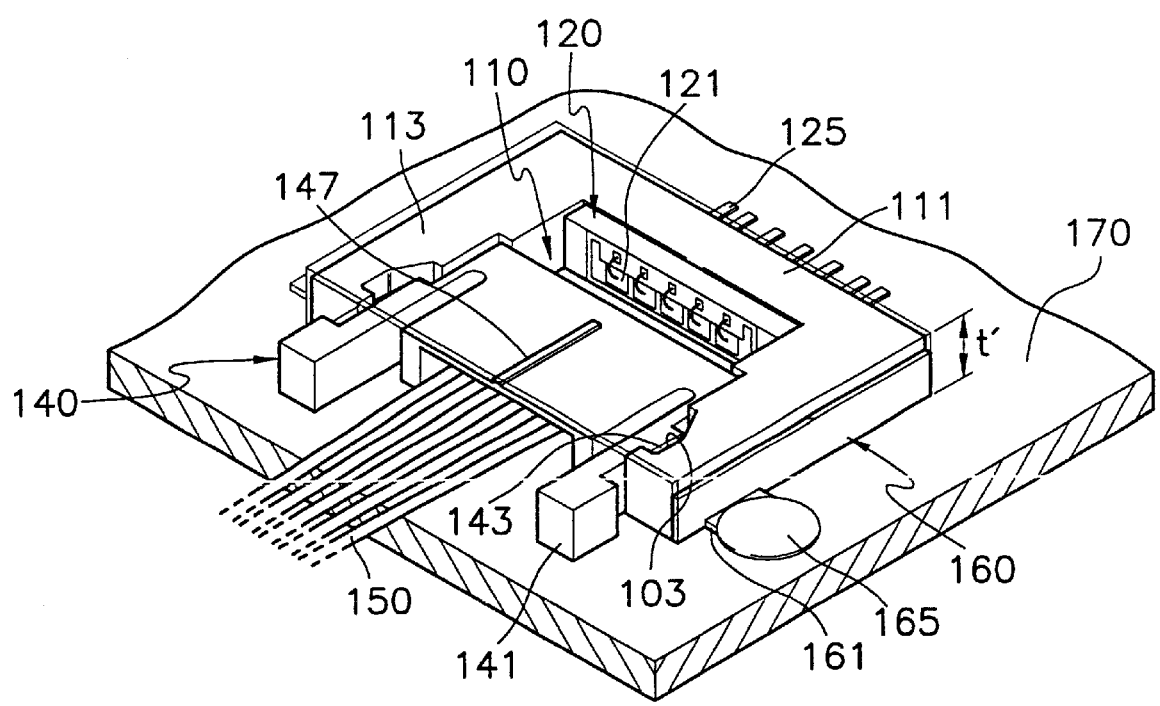
FIG. 3 is a view of the optical connector module mounted onto a printed circuit board.

Also, the cover member 160 has flanges 161 at the bottom edges of both sides thereof, which are used to fasten the optical connector module according to the present invention to a device such as a printed circuitboard (PCB). For example, as shown in FIG. 3, the optical connector module can be attached to the PCB 170 by welding the flanges 161 on the PCB 170 with solder 165. Alternatively, fastener openings (not shown) may be formed in the flanges 161 and then coupled to a PCB with screws (not shown). Even after the optical connector module is attached to the PCB 170, the connector 140 can be easily detached from the body 100 by intentionally pushing flexible portions 141 inward.

The device to be coupled with the optical connector module according to the present invention may be a PCB for driving a liquid crystal display of a notebook computer. The optical connector module according to the present invention can be applied to any device which needs a relatively thin connector for high-speed signal transmission.

In assembling the optical connector module according to the present invention, the holder 120 is mounted onto the base 111 of the body 100, and the optical device 121 is attached to the holder 120 by die bonding and then wire bonded to the electrode 125 for electrical connection. Then, the connector 140 with the optical fibers 150 is appropriately positioned in front of the binding space 110 of the body 100 such that the guide projections 145 of the connector 140 are slidably inserted into the guide grooves 105 of the body 100, which results in engagement between the latches 143 and the latch-receiving grooves 103, and in turn locking of the connector 140 in the body 100. As a result, the optical device 121 and the input/output end 150a of the optical fibers 150 are aligned face-to-face. Then, the cover member 160 is capped on the body 100, thereby resulting in a completed optical connector module.

The completed optical connector module is fixed to a device such as a PCB by solder welding the flanges 161 of the cover member 160 on the device, or by screw coupling the same to the device. The shape of the cover member 160 may be varied with different binding configurations to the body 100.

Figure 4:
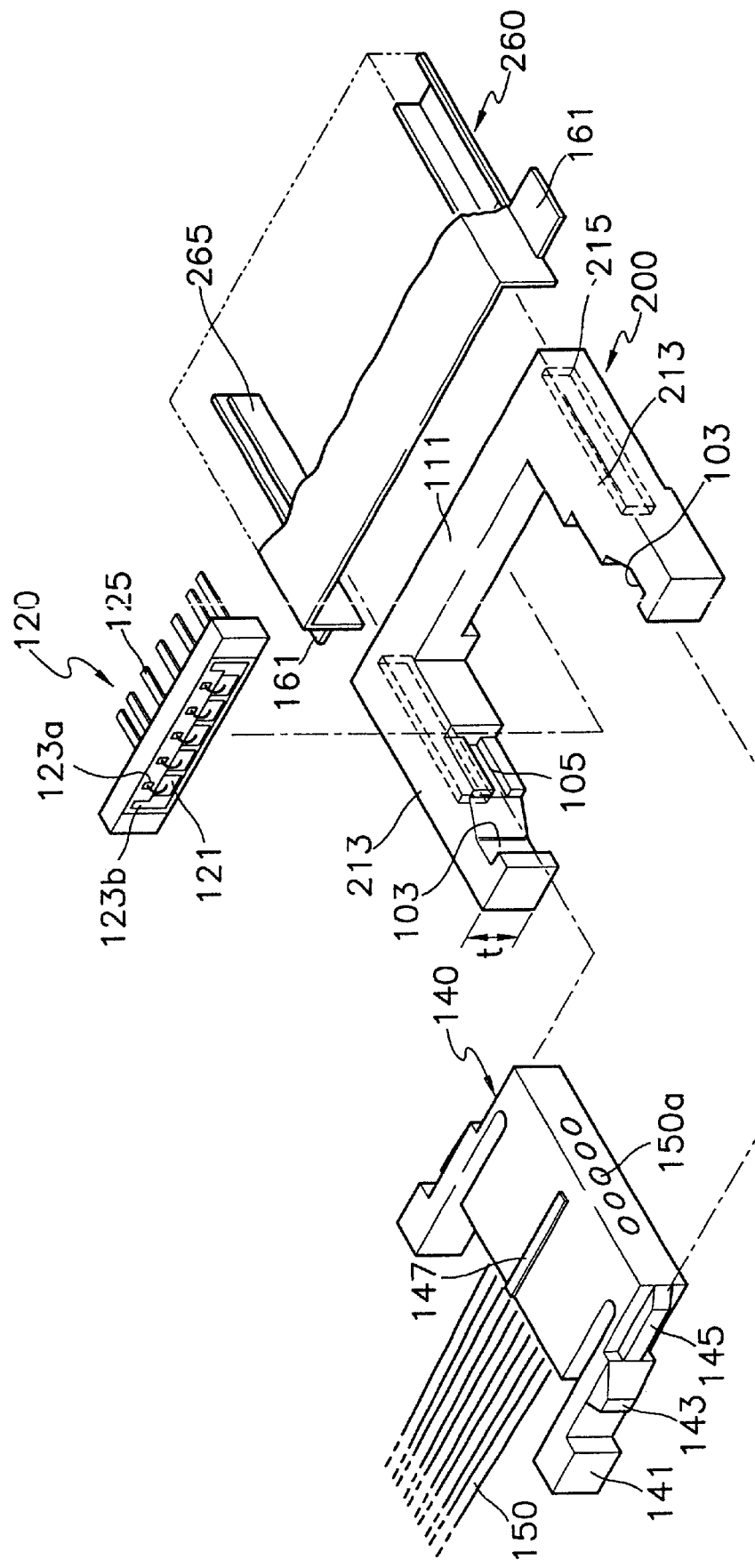
FIG. 4 is a view showing another embodiment of the body and cover member for the optical connector module according to the present invention.

Preferably, as shown in FIG. 4, guide rails 265 are formed on the inner walls of a cover member 260, and rail-receiving grooves 215 extending from the base 111 toward the connector 140 are formed on the outer sides of sidewall portions 213 of a body 200. The cover member 260 is slidably coupled with the body 200 in the opposite direction to the insertion of the connector 140 into the body 200, which assures a more stable combination between the cover member 260 and the body 200.

Figure 5:
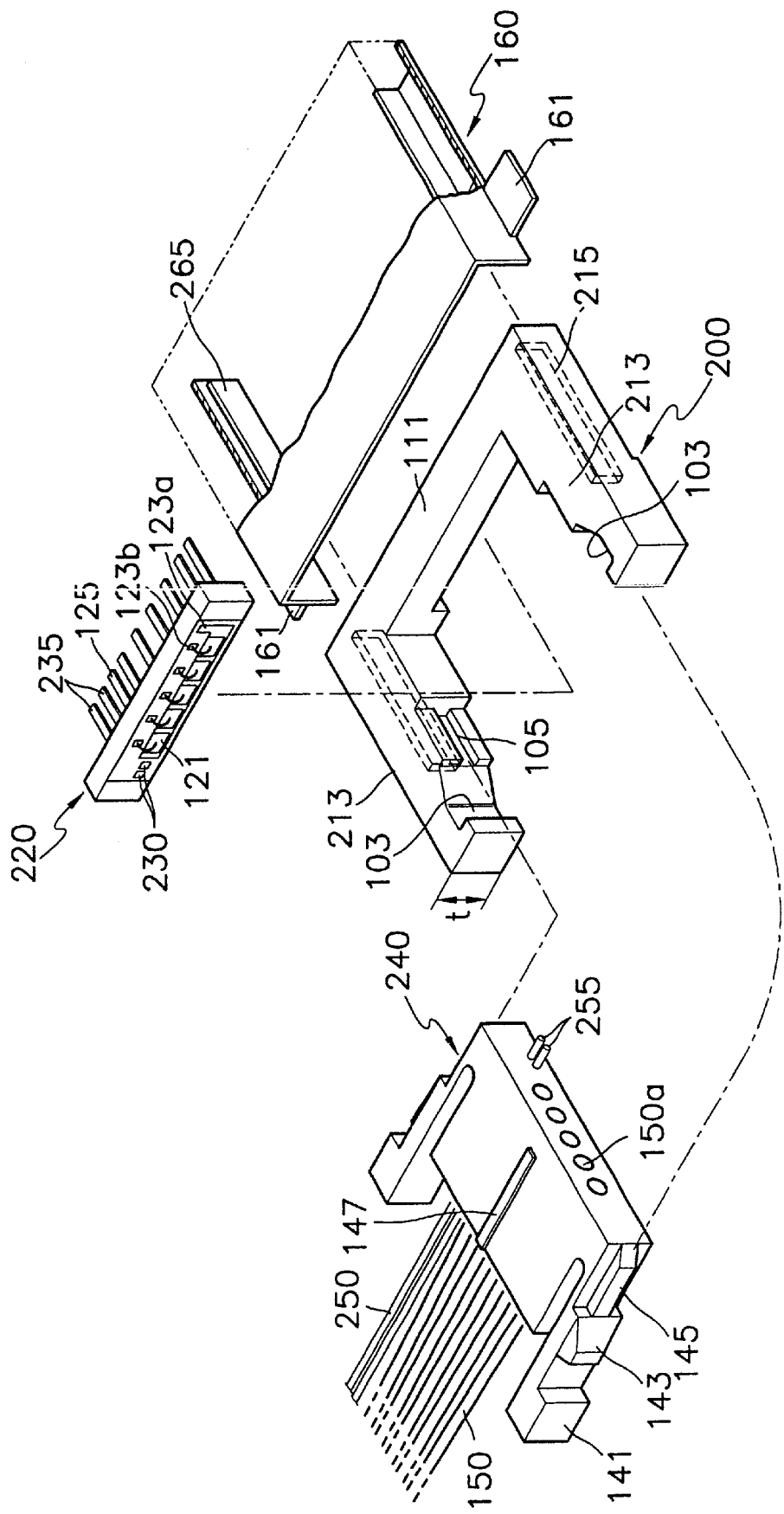
FIG. 5 is an exploded perspective view showing the structure of another optical connector module according to another embodiment of the present invention.

FIG. 5 is an exploded perspective view of another embodiment of the optical connector module according to the present invention. The feature of the present embodiment lies in that an electrical signal coupling means is further incorporated for electrical signal transmission by the combination of the holder 220 and the connector 240 within the body 200. In FIG. 5, like reference numerals are used to designate identical or corresponding parts in FIGS. 2 and 4.

As the electrical signal coupling means, the present embodiment of the optical connector module according to the present invention includes a first electrode member 255 on the connector 240 and a second electrode member 230 at corresponding positions on the holder 220. The first electrode member 255 is formed in the form of a projection type on the leading end of the connector 240 on which the input/output ends 150a of the optical fibers 150 has been exposed to the outside. The plurality of electrodes of the first electrode member 255 are coupled to a plurality of electric wires 250 parallel to the optical fibers 150 via a spring (not shown) which allows elastic movement to the first electrode member 255. The second electrode member 230 is positioned at one side of the optical device 121. As the connector 240 becomes close to the holder 220 in the body 200, the first electrode member 255 is pushed backward by the second electrode member 230 of the holder 220 and stably contacts the second electrode member 230.

It is preferable that the first and second electrode members 255 and 230 are arranged side by side with respect to the input/output ends 150a of the optical fibers 150, and the optical device 121, respectively, in view of the need for a slim design. Also, although the present embodiment is described with reference to the electrical signal coupling means for a pair of transmission paths, the shape and the number of signal transmission paths can be varied as needed.

The optical connector module adopting the electrical coupling means can drive the optical device 121 by supplying the power through the electric wires 250 and the electrical signal coupling means. If the lead 125 connected to the second electrode member 230 is electrically coupled to a device with the optical connector module, driving power for the device can be supplied through the optical connector module. Alternatively, power from other devices can be supplied to the optical device through the optical module connector.

For a high-speed image signal transfer between the main body and a display device of a notebook computer which requires a slim module configuration, an optical connector module according to the present invention positioned at the main body converts an electrical image signal from the main body to an optical image signal and transfers the electrical image signal through the optical fibers 150, and another optical connector module according to the present invention positioned at the display device, for example, an LCD, converts the received optical signal back to an electrical image signal to display an image. Also, power for driving the LCD can be simultaneously provided along with the image signal transfer.

Figure 6:
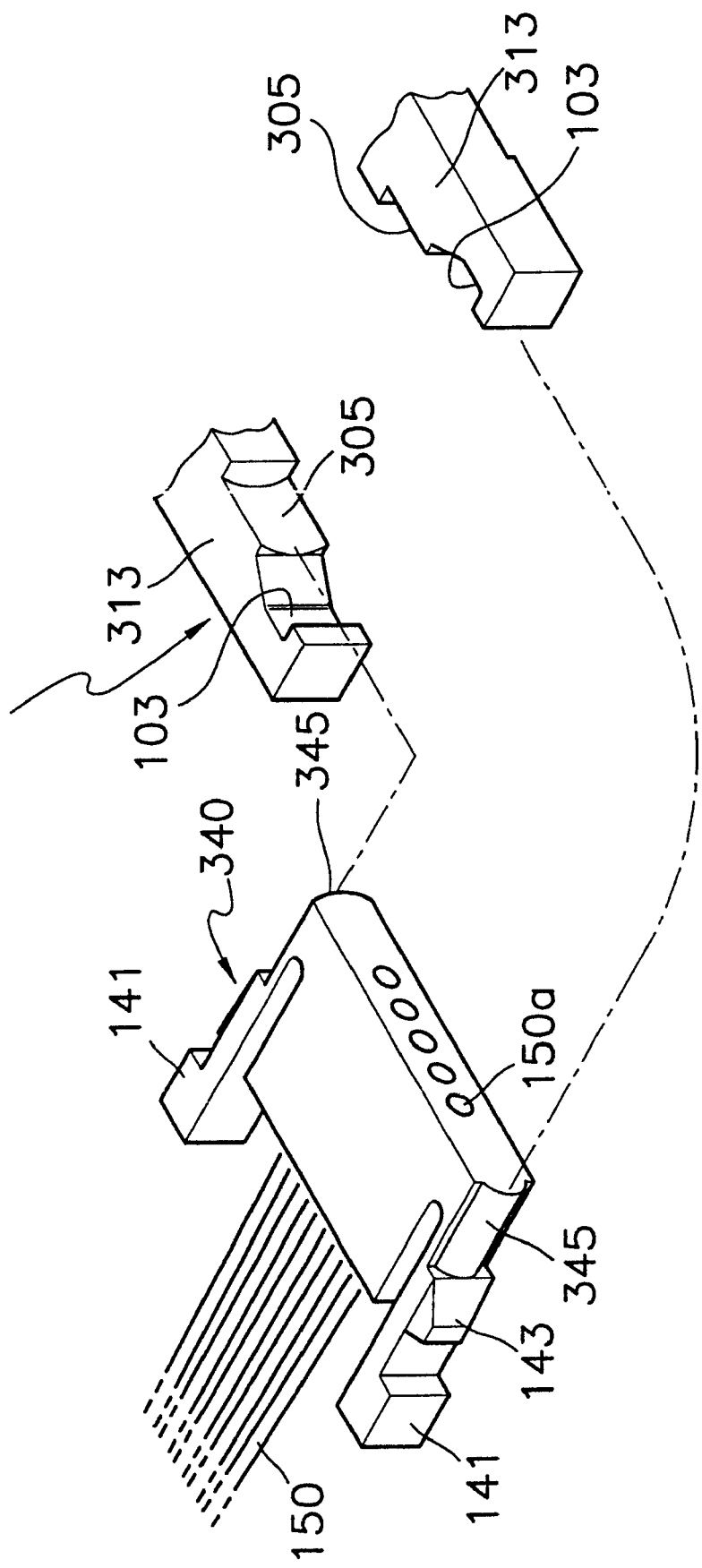
FIG. 6 is a view showing another example of the guiding means for the optical connector module according to the present invention.

FIG. 6 shows another embodiment of means for guiding the connector into the body, which allows for alignment between the optical fibers and the optical device. The connector 340 shown in FIG. 6 has a pair of round guide portions 345 at the leading ends of the flexible portions 141, and the body 300 has a pair of round guide grooves 305, corresponding to the round guide portions 345, at the inner sides of the sidewall portions 313 of the body 300. It is preferable that the curvature of one of the round guide grooves 305 is not identical to the curvature of the other round guide groove, and each of the round guide portions 345 is formed to have a curvature corresponding to the round guide grooves 305. To shape the round guide portions 345 and the round guide grooves 305 to have different curvatures at facing sides indicates the appropriate insertion direction of the connector 340 into the body 300. As the round guide portions 345 of the connector 340 are slidably inserted into the body 300 along the corresponding round guide grooves 305, the connector 340 is engaged with the body 300 and in turn the optical fibers 150 are accurately aligned with the optical device. Such a guiding means is applicable to the optical connector modules shown in FIGS. 2, 4 and 5.

Figure 7:
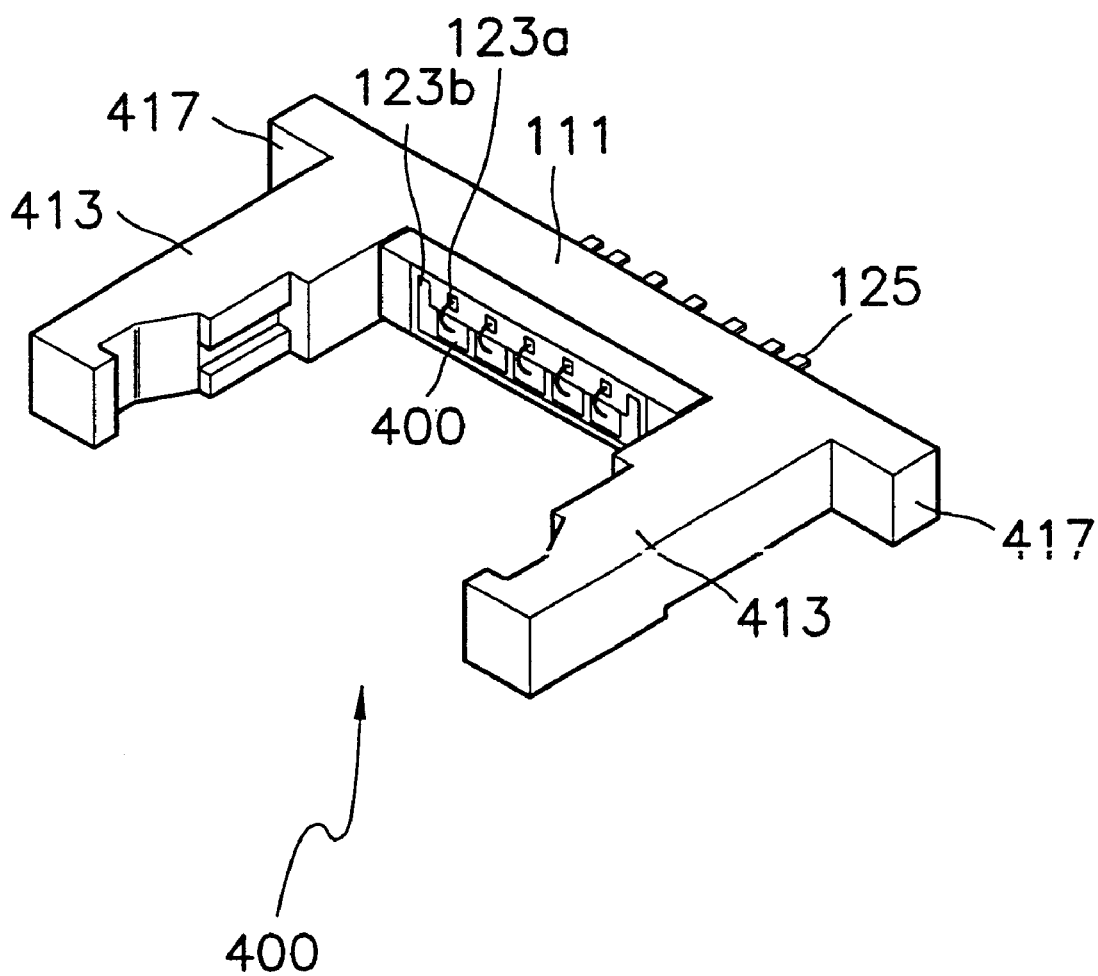
FIG. 7 is a perspective view showing still another embodiment of the body for the optical connector module according to the present invention.

For bonding operations after the combination of the holder with the body, holding the body with a jig (not shown) facilitates bonding operations. For this purpose, as shown in FIG. 7, the body 400 for the optical connector module according to the present invention may farther have jaws 417 on extensions of its base 111. The jaws 417 are useful for accurate installation of the body on the jig, and simultaneously allows the jig to easily hold the body 400. In this case, the shape of the cover member is varied according to the shape of the body.

In the optical connector modules according to the present invention, the body for receiving both the connector and the holder to couple the optical fibers with the optical device is constructed to have an open structure without top and bottom plates, which reduces the thickness of the body. In addition, the cover member is opened downward. As a result, the optical connector module according to the present invention can be manufactured to be slim. The optical connector module according to the present invention can be adapted for high-speed signal reception and transmission to a device which requires such a slim optical connector module, for example, a display unit of notebook computers.

In addition, the open configuration of the body with a binding space therein allows bonding operations after the combination of the holder with the body. If bonding operations can be carried out after insertion of the holder into the body, it is possible for a jig to hold the body, rather than the holder which is relatively smaller than the body, which facilitates bonding operations. Also, guide grooves formed on the inner sides of the body can be used as a reference point for bonding of optical devices, so that the optical device can be accurately aligned with optical fibers, which also allows easy bonding operations.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical connector module, comprising:
   a holder including at least one optical device and electrode;
   a connector having at least one optical fiber providing light transmission, to correspond to the optical device, and latches; and
   a body in an open structure absent top and bottom plates, having a base, a pair of sidewall portions extending from the base, a binding space for receiving the holder and the connector such that input/output ends of the optical fiber of the connector are aligned to the optical device of the holder, and latch-receiving grooves on the sidewall portions to receive the latches of the connector.

2. The optical connector module of claim 1, further comprising means for guiding the connector to an accurate position within the binding space of the body.

3. The optical connector module of claim 2, wherein the means for guiding the connector comprises:
   guide projections on both outer sides of the connector; and
   guide grooves on both inner sides of the side wall portions of the body, the guide grooves for slidably receiving corresponding guide projections.

4. The optical connector module of claim 2, wherein the means for guiding the connector comprises:
   a pair of round guide portions on at least leading parts on sides of the connector; and
   a pair of round guide grooves on inner walls of the sidewall portions of the body, to correspond to the round guide portions, the round guide grooves slidably receiving the round guide portions.

5. The optical connector module of claim 4, wherein the pair of round guide grooves have different curvatures, and the pair of round guide portions on the connector have different curvatures to correspond to those of the round guide grooves, to indicate an appropriate insertion direction of the connector into the body.

6. The optical connector module of claim 2, wherein the means for guiding the connector comprises:
   guide projections on both inner sides of the sidewall portions of the body; and
   guide grooves on both outer sides of the connector, the guide grooves for slidably receiving corresponding guide projections.

7. The optical connector module of claim 1, further comprising jaws at both sides of the body.

8. The optical connector module of claim 1, further comprising an indicator on a top surface of the connector to indicate an appropriate insertion direction of the connector into the body.

9. The optical connector module of claim 1, further comprising:
   a first electrode member on leading side of the connector, on which the input/output ends of the optical fiber are arranged, the first electrode member being electrically connected to electric wires supported by the connector; and
   a second electrode member on the holder, being formed corresponding to the first electrode member,
      wherein as the holder and the connector are combined with the body, the first and second electrode members are electrically coupled to transmit an electrical signal.

10. The optical connector module of claim 9, wherein the first and second electrode members are arranged side by side with respect to the input/output ends of the optical fiber on the connector and the optical device on the holder, respectively.

11. The optical connector module of claim 1, further comprising a cover member being opened downward to cap the body with the connector and holder.

12. The optical connector module of claim 11, wherein the cover member is formed of a relatively thin metal plate.

13. The optical connector module of claim 11, wherein the cover member has flanges at bottom edges of both sides thereof, attaching the optical connector module to a predetermined device.

14. The optical connector module of claim 11, wherein a pair of guide rails for slidably guiding the cover member into the body, and a pair of rail-receiving grooves are formed at corresponding positions on the cover member and the body.

15. The optical connector module of claim 1, wherein the body has a thickness of approximately 2 mm or less.

16. An optical connector module, comprising:
   a holder having an optical device on a first side and a first electrical lead on a second side opposite said first side, said optical device converting optical signals into electrical signals and converting electrical signals into optical signals;
   a connector having an optical fiber that corresponds to said optical device on a first side of said holder, and having input/output ends of said optical fiber on a second side of said connector, said connector having a pair of latches on either side of said connector between said first side and said second side, said second side of said connector mating with said first side of said holder; and
   a U-shaped body having a base portion and a pair of sidewall portions extending from said base portion, said sidewall portions having an inside side and an outside side, said sidewall portions and said base portion provide room bounded by said inside sides of said pair of sidewalls and said base portion to accommodate said holder and said connector within said U-shaped body, said inside side of said sidewall portions having latch receiving grooves that mate with and lock into place said connector attached to said holder.

17. The optical connector module of claim 16, further comprising:
   guide projections on the outer sides of said connector; and
   guide grooves on both inside sides of said sidewall portions of said U-shaped body, the guide grooves slidably receiving said guide projections.

18. The optical connector module of claim 17, further comprising:
   a cover member being open downward to cover said body, said connector, and said holder, said cover member comprised of a thin metal plate, said cover member comprising a pair of guide rails slidably guiding said cover member onto said body, said outside side of said sidewall portions of said U-shaped body having rail receiving grooves formed at corresponding positions to receive said pair of guide rails of said cover.

19. The optical connector module of claim 18, further comprising:
   said first side of said connector having an electric wire protruding therefrom, said electric wire being parallel to said optical fiber, said second side of said connector having a first electrode member opposite said electrical wire and being electrically attached to said electric wire; and
   said first side of said holder having a second electrode member that mates with said first electrode member when said holder is mated with said connector, said second side of said having a second electrical lead extending therefrom and being parallel to said first electrical lead, said second electrical lead being electrically connected to said second electrode member.

20. The optical connector module of claim 16, further comprising:
   a pair of rounded guide portion s on sides of said connector near said second side of said connector; and
   a pair of rounded guide grooves on said inside sides of said sidewall portions of said U-shaped body, to work in operational relationship with said pair of rounded guide portions, the rounded guide grooves slidably receiving the rounded guide portions causing said connector and said holder to fit snugly inside said U-shaped body.

21. An optical connector module, comprising:
   a connecting unit in which at least one optical device is coupled to at least one optical fiber; and
   a cover member being opened downward, capping a top and two sides of the connecting unit and fixed to a top of a substrate of a predetermined device to stably maintain the combination of the connecting unit within the cover member,
      wherein the cover member forms a support structure of the connecting unit along with the substrate of the device.

22. The optical connector module of claim 21, wherein the connecting unit is designed to enable attachment and detachment of the optical fiber or the optical device to and from the connecting unit, and the cover member has at least one open side to enable attachment and detachment of the optical fiber or the optical device to and from the connecting unit.

* * * * *